United States Patent
Isayev (10) Patent No.: US 9,714,333 B2
(45) Date of Patent: Jul. 25, 2017

(54) SINGLE AND TWIN SCREW EXTRUDERS WITH ULTRASOUND HORNS FOR DECROSSLINKING AND DEVULCANIZATION

(75) Inventor: Avraam Isayev, Sunny Isles Beach, FL (US)

(73) Assignee: The University of Akron, Akron, OH (US)

( * ) Notice: Subject to any disclaimer, the term of this patent is extended or adjusted under 35 U.S.C. 154(b) by 591 days.

(21) Appl. No.: 14/111,056

(22) PCT Filed: Apr. 16, 2012

(86) PCT No.: PCT/US2012/033751
§ 371 (c)(1),
(2), (4) Date: Feb. 26, 2014

(87) PCT Pub. No.: WO2012/142562
PCT Pub. Date: Oct. 18, 2012

(65) Prior Publication Data
US 2014/0163129 A1 Jun. 12, 2014

Related U.S. Application Data

(60) Provisional application No. 61/475,702, filed on Apr. 15, 2011.

(51) Int. Cl.
*C08J 11/10* (2006.01)
*B29C 47/00* (2006.01)
(Continued)

(52) U.S. Cl.
CPC .............. *C08J 11/10* (2013.01); *B01J 19/10* (2013.01); *B29C 47/0004* (2013.01);
(Continued)

(58) Field of Classification Search
CPC .. C08J 11/10; B29C 47/6093; B29C 47/0827; B29C 47/0835; B29C 47/385;
(Continued)

(56) References Cited

U.S. PATENT DOCUMENTS 5,258,413 A 11/1993 Isayev
6,396,195 B1 5/2002 Lindblad et al.
(Continued)

FOREIGN PATENT DOCUMENTS

WO 02/066218 8/2002

OTHER PUBLICATIONS

NIIR Board of Consultants and Engineers: "The Complete Book on Rubber Processing and Compounding Technology"; Dec. 31, 2010; ISBN: 978-8-17-833005-1; p. 636.

*Primary Examiner* — Sanza McClendon
(74) *Attorney, Agent, or Firm* — Renner Kenner Greive Bobak Taylor & Weber (57) ABSTRACT

Processes for decrosslinking crosslinked plastic and devulcanizing vulcanized rubber include advancing such materials through single screw or twin screw extruders including special ultrasonic treatment zones wherein threadless shaft (single screw) or shafts (twin screw) rotate under an ultrasonic horn having a distal end aligned with the shaft or shafts and being shaped complimentary thereto. Special arcuate (single screw) or double-arcuate ultrasonic treatment flow paths confine the materials to flow under the horn where the material is subjected to ultrasonic waves to decrosslink the material, in the case of crosslinked plastic, or devulcanize the material, in the case of vulcanized rubber, with the extrudate leaving the die as a continuous stream or rope as is typical of virgin plastic or rubber.

8 Claims, 6 Drawing Sheets

(51) Int. Cl.
 *B29C 47/40* (2006.01)
 *B01J 19/10* (2006.01)
 *B29C 47/92* (2006.01)
 *B29C 47/38* (2006.01)
 *B29C 47/60* (2006.01)
 *B29C 47/08* (2006.01)

(52) U.S. Cl.
 CPC ........ *B29C 47/008* (2013.01); *B29C 47/0009* (2013.01); *B29C 47/0076* (2013.01); *B29C 47/0827* (2013.01); *B29C 47/0835* (2013.01); *B29C 47/385* (2013.01); *B29C 47/40* (2013.01); *B29C 47/6012* (2013.01); *B29C 47/6093* (2013.01); *B29C 47/92* (2013.01); *B29C 2947/92552* (2013.01); *B29C 2947/92876* (2013.01)

(58) Field of Classification Search
 CPC ............ B29C 47/6012; B29C 47/0009; B29C 47/008; B29C 47/0004; B29C 47/40; B29C 47/92; B29C 47/0076; B29C 2947/92876; B29C 2947/92552; B01J 19/10
 See application file for complete search history.

(56) References Cited

U.S. PATENT DOCUMENTS

| | | | |
|---|---|---|---|
| 6,416,705 B1* | 7/2002 | Dinzburg | B29B 13/08 241/1 |
| 7,250,451 B2* | 7/2007 | Tang | B29B 17/0026 521/41 |
| 2004/0251328 A1 | 12/2004 | Kim et al. | |
| 2005/0203197 A1* | 9/2005 | Tang | B29B 17/0026 521/41 |
| 2009/0275689 A1 | 11/2009 | Isayev | |

* cited by examiner

SINGLE AND TWIN SCREW EXTRUDERS WITH ULTRASOUND HORNS FOR DECROSSLINKING AND DEVULCANIZATION

FIELD OF THE INVENTION

The present invention generally relates to extruders with ultrasound horns. More particularly, the present invention relates to single and twin screw extruders having ultrasound horns communicating with the barrel of the extruder. The present invention also relates to methods of employing these single and twin screw extruders for decrosslinking of crosslinked plastics and devulcanization of vulcanized rubber.

BACKGROUND OF THE INVENTION

Among the many environmental problems which mankind faces in the 21st century is the problem of environmental sustainability and management of the tremendous amount of generated polymer waste. Among various polymer wastes, the management of used tires and rubber waste and crosslinked plastics is a major environmental problem requiring an efficient solution. The present invention is specifically directed toward the creation of a new, environmentally friendly ultrasonic single screw and twin screw extrusion apparatus and processes for the recycling of used tires and rubber waste and crosslinked plastics. An extensive research was conducted to understand various parameters of the process and mechanisms and models of rubber devulcanization using a single screw extruder process. This research culminated in the issuance of number of patents and multiple scientific publications in scientific journals and books. Because of these successful efforts the application of the high power ultrasound in the single screw extrusion process for breaking down the rubber network with the purpose of recycling is an established field of study around the world. Though it is a topic of study, the apparatus and processes can still benefit from additional discoveries and developments, such as those disclosed herein.

Notably, to the extent ultrasound has been incorporated into twin screw extruder processes, the ultrasound horn is taught as being placed at the exit of the die of the extruder, as in U.S. Pat. No. 5,284,625. To the extent ultrasound has been incorporated into the single screw extruder process, the ultrasound horn has been placed at the exit of the die of the extruder, as in the aforementioned U.S. Pat. No. 5,284,625. Ultrasound horns have also been placed within the barrel of single screw extruders, as in U.S. Pat. No. 6,095,440, which teaches providing a special helical channel in the barrel and placing the distal end of the horn in this helical channel. The horn is square in cross section and has an arced channel defined at its distal end, the channel extending from one corner of the square to the opposite corner. This is seen as being an undesirable horn design, but is needed to permit the horn to communicate with the special helical channel. These patents teach the devulcanization of rubber in these extruders.

Yet other single screw extruders have been modified to include ultrasound horns within the die, as in European Patent Application No. 1645381, which teaches using such extruders for the purpose of improving properties in molding a resin material. U.S. Patent Application No. 2009/0275689 has also taught placing the ultrasonic horn at the barrel, but for the purpose of dispersing materials in polymers.

The present invention focuses upon the reclaiming of plastics and rubber by the devulcanization of vulcanized rubber and the decrosslinking of crosslinked plastic in single and twin screw extruders, wherein one or more ultrasonic horns are placed at the barrel of the single and twin screw extruders, with a particular flow path provided at the horn.

SUMMARY OF THE INVENTION

The present invention relates to processes utilizing single and twin screw extrusion for efficient decrosslinking of crosslinked plastics and efficient devulcanization of tires and other vulcanized rubber. The processes include either a single or twin screw extruder with one or more ultrasonic water cooled horns placed in the barrel section where ultrasonic waves are imposed in a zone after the feeding section. This special ultrasonic treatment zone consists of a streamlined arcuate ultrasonic treatment flow path through which powdered crosslinked plastics or vulcanized rubber passes, the arcuate treatment flow path being defined, in part, by a clearance of a chosen depth and length. In a single screw extruder, this clearance is located between a rotating shaft and the distal end of a specially configured ultrasonic horn, and, similarly, in a twin screw extruder, this clearance is located between two rotating cylindrical shafts and the distal end of a specially configured ultrasonic horn. In each case, the tip of the horn is shaped such that it has a cylindrical arc surface (single) or cylindrical double-arc surfaces (twin) being substantially parallel with surfaces of the rotating shaft or shafts. A special arrangement is made to prevent flow of the material away from the clearance between the shaft/shafts and horn.

Vulcanized rubber or crosslinked plastic powder is fed at the feed section of the extruder under a controlled flow rate by a feeder. By the rotational action of the screw or screws, the powder is delivered to the ultrasonic treatment zone. During the passage under the tip of the horn, the powder is devulcanized or decrosslinked, becomes flowable as a typical unvulcanized rubber or decrosslinked plastic, and is pushed toward the die located at the end of the extruder. It is unexpectedly observed that, at some processing conditions, the plastic or rubber exits the die as a continuous rope in contrast to being a loose and broken extrudate. The temperature of the ultrasonic horn or horns is controlled by water or other types of cooling media delivered from a thermostat to cooling channels provided in the horns. The frequency and amplitude of ultrasonic waves can be varied. In the section between the ultrasonic treatment zone and die, the devulcanized rubber or decrosslinked plastic is cooled, if required due to excessive temperature rise, and subjected to further plastication. The ultrasonically devulcanized rubber or decrosslinked plastic obtained using the apparatus and processes herein can be mixed with required curatives and shaped into desirable products and revulcanized or recrosslinked.

The twin screw extruders utilized in these processes can be modular co-rotating or counter-rotating extruders. The twin screw extruders offer a precise control of the temperature, rotational speed and flow rate, especially in the case fine powders, and this control is not readily achieved with a single screw extrusion process. Particularly, the twin screw extruder more easily receives fine powder material (plastics and rubber) as compared to single screw extruders, which suffer from fine powders bridging the feeding zone and resisting being fed to the single screw. Also, another advantage of the twin screw process is the fact that it operates at a lower pressure and lower ultrasonic power consumption. An additional advantage of the ultrasonic twin screw extruder is the fact that it has a clam shell barrel which is amenable to easy cleaning by opening the barrel. Certainly, the novel ultrasonic twin screw extrusion devulcanization process is more efficient than the ultrasonic single screw extrusion devulcanization processes so far known in the art. Also, the discovered process provides a more uniform devulcanized rubber than that of the ultrasonic single screw extrusion devulcanization process.

In a first embodiment, this invention provides a process for decrosslinking crosslinked plastics or devulcanizing vulcanized rubber comprising the steps of: feeding crosslinked plastic or vulcanized rubber to a screw extruder having a screw in a barrel, the screw having an axis; advancing the crosslinked plastic or vulcanized rubber, by rotation of the screw, to an ultrasonic treatment zone in the barrel, the ultrasonic treatment zone including: a body having a cylindrical bore therethrough defining a bore axis, the body also having a horn passage communicating with the cylindrical bore, a cylindrical shaft associated with the screw to rotate therewith, the shaft rotating in the bore of the body and providing no threads such that the crosslinked plastic or vulcanized rubber is not advanced by rotation of the shaft, but rather is advanced by rotation of the screw forcing the crosslinked plastic or vulcanized rubber into the ultrasonic treatment zone, and an ultrasonic horn extending into said horn passage, the ultrasonic horn being aligned over the cylindrical shaft and having a distal end spaced from the cylindrical shaft, the distal end being shaped complimentary to the shaft to define a portion of an arcuate ultrasonic treatment flow path; and advancing the crosslinked plastic or vulcanized rubber through the arcuate ultrasonic treatment flow path; ultrasonically treating the crosslinked plastic or vulcanized rubber at the arcuate ultrasonic treatment flow path by ultrasonic waves generated by the ultrasonic horn.

A second embodiment provides the process of the first embodiment, wherein the cylindrical bore in the body is devoid of channels.

A third embodiment provides the process of the first or second embodiments, wherein the distal end of the ultrasonic horn is rectangular in cross section such that the volume of crosslinked plastic or vulcanized rubber advanced through the arcuate ultrasonic treatment flow path in said step of advancing the crosslinked plastic or vulcanized rubber through the arcuate ultrasonic treatment flow path experiences a more uniform mean residence time in the ultrasonic treatment zone.

A fourth embodiment provides the process of any of the first through third embodiments, wherein the ultrasonic treatment zone further comprises a stationary insert extending partially around the shaft within the bore of the body, the arcuate ultrasonic treatment flow path being defined between the shaft, the stationary insert, the distal end of the ultrasonic horn and the horn passage.

A fifth embodiment provides the process of any of the first through fourth embodiments, wherein the frequency of the ultrasonic waves is from 15 kHz to 1000 kHz.

A sixth embodiment provides the process of any of the first through fifth embodiments, wherein the amplitude of the ultrasonic waves is from 2 microns to 100 microns.

A seventh embodiment provides the process of any of the first through sixth embodiments, wherein the residence time of the crosslinked plastic or vulcanized rubber in the arcuate ultrasonic treatment flow path is less than 60 seconds.

An eighth embodiment provides the process of any of the first through seventh embodiments, wherein the residence time of the crosslinked plastic or vulcanized rubber in the arcuate ultrasonic treatment flow path is less than 5 seconds.

A ninth embodiment of this invention provides a process for decrosslinking crosslinked plastic or devulcanizing vulcanize rubber comprising the steps of: feeding crosslinked plastic or vulcanized rubber to a twin screw extruder having a first screw and second screw in a barrel, the first screw having a first axis and the second screw having a second axis; advancing the crosslinked plastic or vulcanized rubber, by rotation of the first screw and the second screw, to an ultrasonic treatment zone in the barrel, the ultrasonic treatment zone including: a body including: a first bore through the body, the first bore having a bore axis that is coaxial with the axis of the first screw, a second bore through the body, the second bore having a bore axis that is coaxial with the axis of the second screw, the first bore and second bore overlapping to create a twin bore, a horn passage communicating with both the first bore and the second bore of the twin bore, a first cylindrical shaft associated with the first screw to rotate therewith, the first cylindrical shaft rotating in the first bore of the body and providing no threads such that the crosslinked plastic or vulcanized rubber is not advanced by rotation of the first cylindrical shaft, but rather is advanced by rotation of the first screw and second screw forcing the crosslinked plastic or vulcanized rubber into the ultrasonic treatment zone, a second cylindrical shaft associated with the second screw to rotate therewith, the second cylindrical shaft rotating in the second bore of the body and providing no threads such that the crosslinked plastic or vulcanized rubber is not advanced by rotation of the second cylindrical shaft, but rather is advanced by rotation of the first screw and second screw forcing the crosslinked plastic or vulcanized rubber into the ultrasonic treatment zone, the first cylindrical shaft and second cylindrical shaft contacting one another, an ultrasonic horn extending into said horn passage, the ultrasonic horn being aligned over both the first shaft and second shaft and having a distal end spaced from the first shaft and the second shaft, the distal end being shaped complimentary to the first shaft and the second cylindrical shaft to define a portion of a double-arcuate ultrasonic treatment flow path; advancing the crosslinked plastic or vulcanized rubber through the double-arcuate ultrasonic treatment flow path; and ultrasonically treating the crosslinked plastic or vulcanized rubber at the double-arcuate ultrasonic treatment flow path by ultrasonic waves generated by the ultrasonic horn.

A tenth embodiment provides the process of the ninth embodiment, wherein the first bore and the second bore in the body are devoid of channels.

An eleventh embodiment provides the process of the ninth or tenth embodiments, wherein the distal end of the ultrasonic horn is rectangular in cross section such that the volume of crosslinked plastic or vulcanized rubber advanced through the double-arcuate ultrasonic treatment flow path in said step of advancing the crosslinked plastic or vulcanized rubber through the double-arcuate ultrasonic treatment flow path experiences a more uniform ultrasonic treatment time distribution.

A twelfth embodiment provides the process of any of the ninth through eleventh embodiments, wherein the ultrasonic treatment zone further comprises one or more stationary inserts extending partially around the first shaft within the first bore and the second shaft within the second bore of the body, the double-arcuate ultrasonic treatment flow path being defined between the first shaft, the second shaft, at least one of the one or more stationary inserts, the distal end of the ultrasonic horn and the horn passage.

A thirteenth embodiment provides the process of any of the ninth through twelfth embodiments, wherein the frequency of the ultrasonic waves is from 15 kHz to 1000 kHz A fourteenth embodiment provides the process of any of the ninth through thirteenth embodiments, wherein the amplitude of the ultrasonic waves is from 2 microns to 100 microns A fifteenth embodiment provides the process of any of the ninth through fourteenth embodiments, wherein the residence time of the crosslinked plastic or vulcanized rubber in the arcuate ultrasonic treatment flow path is less than 5 seconds.

This invention also provides a single screw extruder having a screw in a barrel, the screw having an axis, the single screw extruder characterized in that it includes an ultrasonic treatment zone in the barrel, the ultrasonic treatment zone comprising: a body having a cylindrical bore therethrough defining a bore axis, the body also having a horn passage communicating with the cylindrical bore, a cylindrical shaft associated with the screw to rotate therewith, the shaft rotating in the bore of the body and providing no threads, and an ultrasonic horn extending into said horn passage, the ultrasonic horn being aligned over the cylindrical shaft and having a distal end spaced from the cylindrical shaft, the distal end being shaped complimentary to the shaft to define a portion of an arcuate ultrasonic treatment flow path.

In yet another embodiment, this invention provides a twin screw extruder having a first screw and second screw in a barrel, the first screw having a first axis and the second screw having a second axis, the twin screw extruder characterized in that it includes an ultrasonic treatment zone in the barrel, the ultrasonic treatment zone comprising: a body including a first bore through the body, the first bore having a bore axis that is coaxial with the axis of the first screw, a second bore through the body, the second bore having a bore axis that is coaxial with the axis of the second screw, the first bore and second bore overlapping to create a twin bore, and a horn passage communicating with both the first bore and the second bore of the twin bore; a first cylindrical shaft associated with the first screw to rotate therewith, the first cylindrical shaft rotating in the first bore of the body and providing no threads; a second cylindrical shaft associated with the second screw to rotate therewith, the second cylindrical shaft rotating in the second bore of the body and providing no threads, the first cylindrical shaft and second cylindrical shaft contacting one another; and an ultrasonic horn extending into said horn passage, the ultrasonic horn being aligned over both the first shaft and second shaft and having a distal end spaced from the first shaft and the second shaft, the distal end being shaped complimentary to the first cylindrical shaft and the second cylindrical shaft to define a portion of a double-arcuate ultrasonic treatment flow path.

DETAILED DESCRIPTION OF ILLUSTRATIVE EMBODIMENTS

Figure 1:
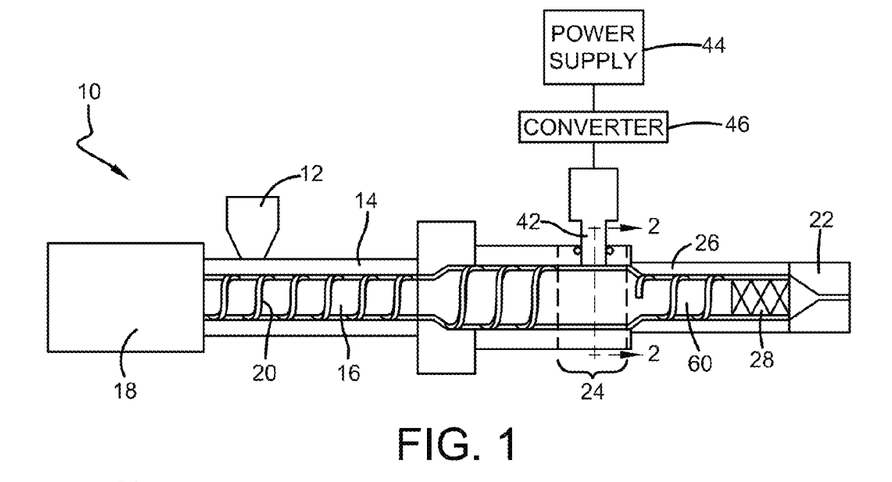
FIG. 1 is a schematic side elevational view of a single screw extruder in accordance with this invention.

Referring now to FIG. 1, a single screw extruder in accordance with this invention is shown and designated by the numeral 10. This single screw extruder 10 is utilized for decrosslinking crosslinked plastics and devulcanizing rubber. As known, the single screw extruder 10 includes a hopper 12 used to feed material to the barrel 14, which includes a single screw 16 that is rotationally driven by a primary drive assembly 18 to advance material by means of threads 20 toward a die 22. The present invention advances the art by providing an ultrasonic treatment zone 24, where the crosslinked plastic or vulcanized rubber advanced through the single screw extruder 10 is treated with ultrasound and thereby decrosslinked or devulcanized. As known, the extruder 10 may have multiple zones, each zone being maintained at a desired temperature. The present invention is directed particularly to the ultrasonic treatment zone 24.

Although a single screw 16 is shown, it will be appreciated that other structures may be employed in the barrel 14, for example, UCC mixers, melt star mixers and the like. After the ultrasonic treatment zone 24, a plasticizing section 26 may be employed to further shear the decrosslinked plastic and plasticize it for extrusion through the die 22. Though not required, the extruder 10 shows a melt star mixer 28 in the plasticizing section 26 in order to visually show the options for the mixing elements of the extruder. The general use of an extruder is known, and the present invention is directed particularly to the novel ultrasonic treatment zone 24, which is disclosed more particularly with reference to the cross section of FIG. 2.

Figure 2:
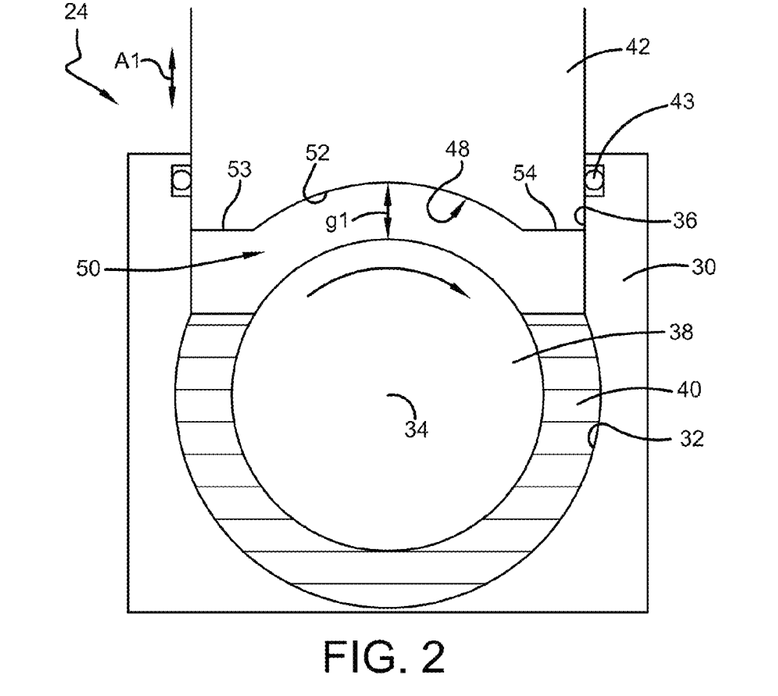
FIG. 2 is a cross-sectional view of an ultrasonic treatment zone of the single screw extruder of FIG. 1, taken along the line 2-2.

With reference to FIG. 2, it can be seen that the ultrasonic treatment zone 24 includes a body 30 having a bore 32 extending therethrough and defining a bore axis 34. The body 30 also includes a horn passage 36 that extends through the body to communicate with the bore 32. A cylindrical shaft 38 resides in the bore 32, and, in particularly embodiments is coaxial therewith, i.e., the axis of the shaft 38 lies on the bore axis 34, in some embodiments. The cylindrical shaft 38 is associated with the screw 16 (by being formed therewith or keyed thereto) to rotate with the screw 16 such that the cylindrical shaft 38 rotates in the bore 32 of the body 30. Notably, the cylindrical shaft 38 within the ultrasonic treatment zone 24 includes no threads such that the material (i.e., crosslinked plastic or vulcanized rubber) is not advanced by rotation of the shaft, per se, but rather is advanced by rotation of the screw 16 and its threads 20, which force the material into and through the ultrasonic treatment zone 24. The threadless shaft 38, nevertheless shears the material. It should be noted that the interior surface of the bore 32 has no channels.

In this particular embodiment shown in FIG. 2, the cylindrical shaft 38 rotates within a stationary insert 40 that extends partially around the cylindrical shaft 38 between the interior surface of the bore 32 and the exterior of the cylindrical shaft 38. The bore 32 is shown as cylindrical, but need not be, particularly where a stationary insert 40 is employed. It should be appreciated, however, that body 30 could be shaped to intimately engage the cylindrical shaft 38, such that a stationary insert 40 would not be necessary. The stationary insert 40 could also be provided in multiple pieces in order to facilitate assembly.

An ultrasonic horn 42 extends into the horn passage 36 and is aligned over the cylindrical shaft 38. With reference to FIG. 1, it can be seen that a power supply 44 and converter 46 provide the vibrational energy in the ultrasonic frequency range so that the horn 42 delivers ultrasonic energy at the ultrasonic treatment zone. The ultrasonic horn 42 includes a distal end 48 that is spaced from the cylindrical shaft 38 and shaped complementary thereto, as at arcuate portion 52, so as to define a portion of an arcuate ultrasonic treatment flow path 50. It should be appreciated that, by "shaped complementary" it is meant that the curvature of the distal end 48 closely mimics the curvature of the shaft, though an identical curvature is not specifically required. In some embodiments, the curvature of the distal end 48 will be identical to the curvature of the shaft 38 such that the distal end 48 of the horn 42 could be intimately fitted directly on top of the cylindrical shaft 38, providing no gap there between (though a gap is necessary to operate the extruder). However, variations in curvature are permitted, as the intent is to provide an arcuate ultrasonic treatment flow path 50 directly under the horn 42, requiring the material to pass under the horn through a small gap such that the entire mass of material is ultrasonically treated. In the particular embodiments shown, it will be appreciated that the arcuate ultrasonic treatment flow path 50 is defined between the cylindrical shaft 38, the stationary insert 40, the distal end 48 of the ultrasonic horn 42, and the horn passage 36. Further, while the distal end 48 includes an arcuate portion 52, it may also include planar feet 53, 54 extending laterally from the arcuate portion 52.

The horn 42 is movable closer to and farther away from the cylindrical shaft 38, as represented by the double-headed arrow A1. The horn 42 moves past an appropriate seal 43, which serves to prohibit the flow of material between the horn 42 and the wall of the horn passage 36. In one embodiment, the seal 43 is a high temperature graphite-filled polyimide fitted within a recess in the horn passage 36. By moving the horn 42 away from the cylindrical shaft 38, a gap g 1 is defined between the apex of the arcuate portion 52 of the horn 42 and the apex of the cylindrical shaft 38. In embodiments where the arcuate portion 52 of the distal end 48 is identical to the curvature of the cylindrical shaft 38, this gap g 1, will remain constant along the circumference of the shaft 38, but it will be appreciated that, in embodiments where the arcuate portion 52 is not identical, the gap will vary slightly. The gap at the feet 53, 54, when present, will be similar, but need not be identical to the gap, g1, at the apex. In particular embodiments, the gap g1 will range from 0.1 to 15 millimeters (mm). In other embodiments, the gap g1 will range from 0.2 to 10 mm, in other embodiments, from 0.5 to 5 mm, and, in other embodiments, from 1 to 3 mm. Again, the gap may vary along the circumference of the shaft 38, but should remain less than 15 mm at all locations, and, in other embodiments, less than 10 mm, in other embodiments, less than 5 mm, in other embodiments, less than 3 mm, and, in other embodiments, less than 2 mm. The gap should also remain greater than 0.1 mm at all locations, and, in other embodiments, greater than 0.2 mm, in other embodiments, greater than 1 mm, and, in other embodiments, greater than 2 mm.

The material is advanced by the screw 16 at a feed rate such that the residence time under the horn 42, i.e., the residence time at the arcuate ultrasonic flow path 50 is from 1 to 60 seconds. In other embodiments, the residence time is less than 60 seconds, in other embodiments, less than 30 seconds, in other embodiments, less than 15 seconds, in other embodiments, less than 10 seconds, in other embodiments, less than 5 seconds, in other embodiments, less than 2 seconds, in other embodiments, less than 1 second.

The ultrasonic horn 42 preferably operates at a frequency of from 15 kHz to 1000 kHz. In other embodiments, the horn 42 preferably operates from 20 kHz to 100 kHz, in other embodiments, from 20 kHz to 50 kHz, and in other embodiments, from 20 kHz to 40 kHz. The ultrasonic horn 42 preferably operates at an amplitude of from 2 microns to 50 microns. In other embodiments, the horn 42 preferably operates at an amplitude of from 5 microns to 30 microns, in other embodiments, from 5 microns to 20 microns.

Figure 5:
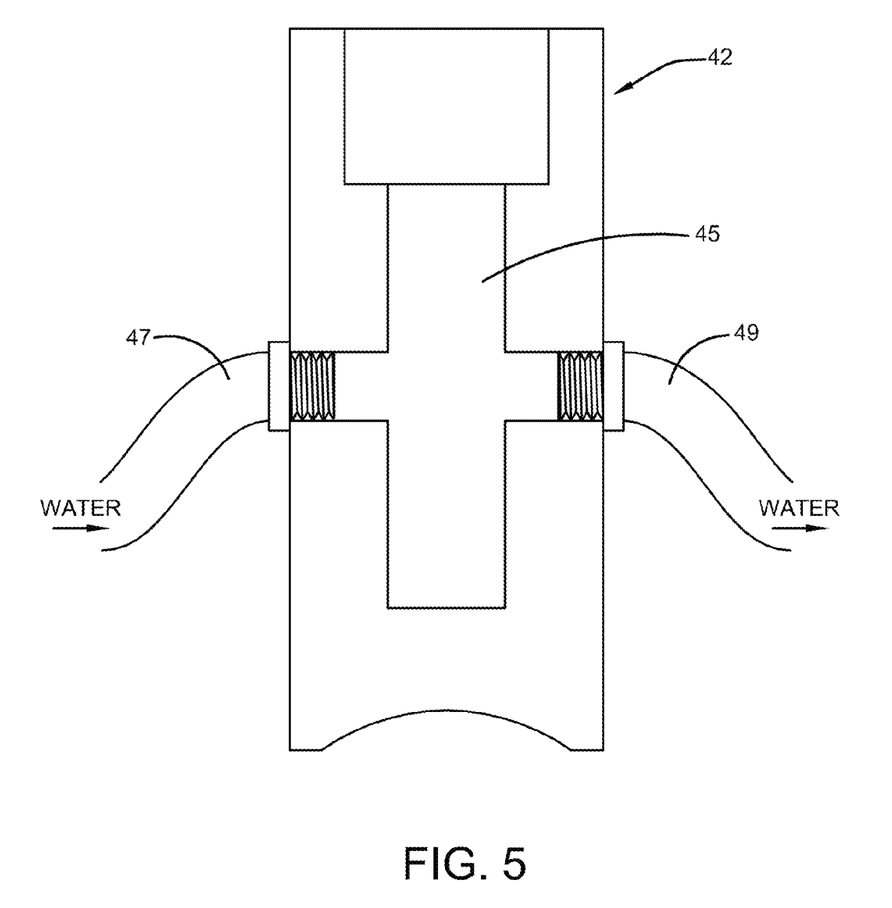
FIG. 5 is a general side elevational view of an ultrasonic horn employed herein, showing cooling channels.

With reference to FIG. 5, the horn 42 is preferably water cooled. To cool the horn 42, an interior chamber 45 is formed in the horn 42, and an inlet tube 47 is provided for feeding water to the chamber 45, while an outlet tube 49 is provided for accepting the flow of water out of the chamber 45. The chamber 45 is centrally located and extends along a substantial portion of the height of the horn 42 to permit circulation of water along the height and provide for efficient cooling. Notably, in preferred embodiments, the inlet 47 and outlet 49 are positioned at the nodal point of the horn, that is, where the amplitude of the ultrasonic wave is zero, so as to reduce the chance of damaging the inlet and outlet. The water may be fed at any appropriate temperature to reduce the heat of the horn 42. Typically, the water may be in the range of 10 to 90° C.

It will be appreciated that, if the horn 42 were to be cylindrical, the residence time of the material flowing through the arcuate ultrasonic treatment flow path 50, under the horn 42, might significantly vary for any given volume of material. Particularly, the horn 42, if cylindrical, would have a maximum width at its center (relative to the direction of flow of the material), and that width would decrease along the direction of flow as one considers a position moving off center toward the right or left (with respect to the cross section of FIG. 2). Material passing under the widest portion of the horn would have a longer ultrasonic treatment time (i.e., a longer residence time under the horn). Thus, in particular embodiments, the horn 42 is created with a rectangular cross section such that the volume of material advanced through the arcuate ultrasonic treatment flow path 50 experiences a more uniform ultrasonic treatment time distribution. It should further be noted that the arcuate portion 52 extends from one sidewall of the rectangular horn to the opposite sidewall, as opposed to the helical arcuate portion of U.S. Pat. No. 6,095,440, which extends from one corner point to an opposite corner. The structure of the present horn is more robust, particularly when including the feet 53, 54.

It should be noted that, while the present figures show one horn 42 at the ultrasonic treatment zone 24, multiple horns could be employed. For example, is some embodiments, the general structure shown for horn 42 entering a horn passage 36 extending downwardly through the body 30 could be repeated for a second horn entering a horn passage extending upwardly through the body, or even from the left or right. Additionally, more than one ultrasonic treatment zone 24 may be placed along the length of the barrel 14.

From the ultrasonic treatment zone 24, the cylindrical shaft 38, which includes no threads, is secured or otherwise associated with a threaded shaft as at 60 (FIG. 1). The decrosslinked plastic or devulcanized rubber forced out of the ultrasonic treatment zone 24 is thereby advanced to the die 22, where if processed properly according to the parameters set forth herein, the material will form a continuous rope extrudate, much like virgin plastic or rubber material. As already mentioned, the extruder 10 may include multiple mixing sections, such as a melt star mixer represented at numeral 28.

With the structure disclosed above, a process for decrosslinking crosslinked plastics and devulcanizing vulcanized rubber includes feeding crosslinked plastic or vulcanized rubber (herein collectively referred to as "material") to a screw extruder 10 having a screw 16 in a barrel 14. The material is advanced, by rotation of the screw 16, to the ultrasonic treatment zone 24 in the barrel 14. The ultrasonic treatment zone includes a body 30 having a bore 32 therethrough defining a bore axis. The body 30 also has a horn passage 36 communicating with the bore 32. A cylindrical shaft 38 is associated with the screw 16 to rotate therewith, and rotates in the bore 32 of the body 30. The shaft provides no threads such that the material is not advanced by rotation of the shaft 38, but rather is advanced by rotation of the screw 16 forcing the material into the ultrasonic treatment zone 24. An ultrasonic horn 42 extends into the horn passage 36 and is aligned over the cylindrical shaft 38. The ultrasonic horn 42 has a distal end 48 that is spaced from the cylindrical shaft 38, the distal end 48 being shaped complementary to the shaft 38 to define a portion of an arcuate ultrasonic treatment flow path 50.

The material is advanced through the arcuate ultrasonic treatment flow path 50 and is ultrasonically treated at the arcuate ultrasonic treatment flow path 50 by ultrasonic waves generated by the ultrasonic horn 42. The treatment follows the residence times, frequencies and amplitudes disclosed herein. The result is that the crosslinked plastic is decrosslinked or vulcanized rubber is devulcanized.

Figure 3:
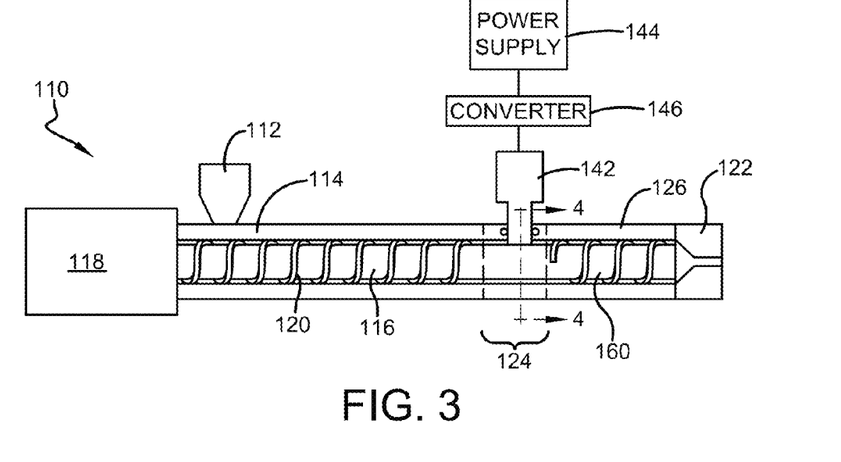
FIG. 3 is a schematic side elevational view of a twin screw extruder in accordance with this invention.

Referring now to FIG. 3, a twin screw extruder in accordance with this invention is shown and designated by the numeral 110. This twin screw extruder 10 is somewhat similar to the single screw extruder 10 of FIGS. 1 and 2, though its structure at an ultrasonic treatment zone 124 is a bit more complicated due to the presence of two shafts 138a, 138b. Due to the similarities, like parts receive like numerals but increased by 100. The twin screw extruder 110 is utilized for decrosslinking crosslinked plastics and for devulcanizing vulcanized rubber. As known, the twin screw extruder 110 includes a hopper 112 used to feed material to the barrel 114, which includes a two mating screws, as known, though only one screw 116 is visible in the side view of FIG. 3. Although two continuous screws may be employed, it will be appreciated that a twin screw extruder with modular twin screw elements is typically employed. The focus herein is on the ultrasonic treatment zone 124. The screws are rotationally driven by a primary drive assembly 118 to advance material by means of threads 120 toward a die 122. The present invention advances the art by providing an ultrasonic treatment zone 124, where the vulcanized rubber or crosslinked plastic advanced through the twin screw extruder 110 is treated with ultrasound and thereby devulcanized (rubber) or decrosslinked (plastic). As known, the extruder 110 may have multiple zones, each zone being maintained at a desired temperature. The present invention is directed particularly to the ultrasonic treatment zone 124.

Although only a basic screw structure is shown, as at 116, it will be appreciated that other structures may be employed in the barrel 114, for example, screws with modular screw elements may be employed. The general use of a twin screw extruder is know, and the present invention is directed particularly to the novel ultrasonic treatment zone 124, which is disclosed more particularly with reference to the cross section of FIG. 4.

Figure 4:
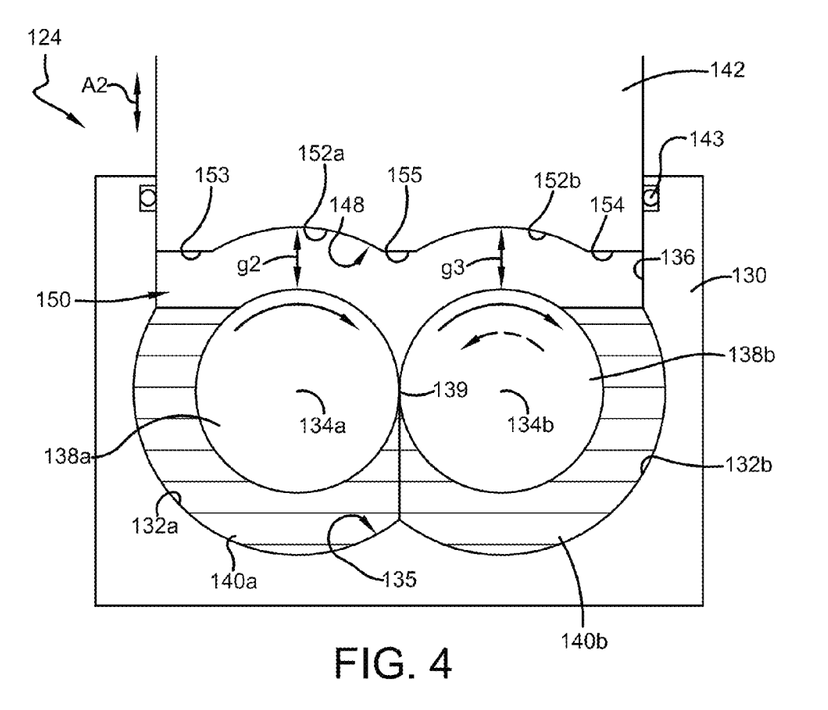
FIG. 4 is a cross-sectional view of an ultrasonic treatment zone of the twin screw extruder of FIG. 3, taken along the line 4-4.

With reference to FIG. 4, it can be seen that the ultrasonic treatment zone 124 includes a body 130 having a first bore 132a extending therethrough and defining a bore axis 134a, a second bore 132b extending therethrough and defining a bore axis 134b, the first bore 132a and the second bore 132b overlapping to create a twin bore 135. The body 130 also includes a horn passage 136 that extends through the body to communicate with the twin bore 135, aligned over both the first bore 132a and the second bore 132b. A first cylindrical shaft 138a resides in the first bore 132a, and, in particularly embodiments is coaxial therewith, i.e., the axis of the first shaft 138a lies on the bore axis 134a, in some embodiments. The cylindrical shaft 138 is associated with the screw 116 (by being formed therewith or keyed thereto) to rotate with the screw 116 such that the cylindrical shaft 138a rotates in the first bore 132a of the body 130. A second cylindrical shaft 138b resides in the second bore 132b, and, in particularly embodiments is coaxial therewith, i.e., the axis of the second shaft 138b lies on the bore axis 134b, in some embodiments. The second cylindrical shaft 138b is associated with the screw that is not shown in FIG. 3 (by being formed therewith or keyed thereto) and rotates with that screw such that the second cylindrical shaft 138b rotates in the second bore 132 of the body 130. Notably, neither the first cylindrical shaft 138a, nor the second cylindrical shaft 138b, within the ultrasonic treatment zone 124, includes threads such that the material (i.e., crosslinked plastic) is not advanced by rotation of the shafts 138a, 138b, per se, but rather is advanced by rotation of the screw 116 (and the other, unseen screw) and their threads 120, which force the material into and through the ultrasonic treatment zone 124. The threadless shafts 138a, 138b nevertheless shear the material (i.e., crosslinked plastic or vulcanized rubber). It should be noted that the interior surface of the bore 132 has no channels. The shafts are shaped and spaced so as to touch as at point 139. The shafts 138a, 138b may rotate in the same direction, as represented by the solid line arrows drawn on the shafts in FIG. 4, or may rotate in opposite directions, as represented by the solid arrow drawn on shaft 138a and the dashed arrow drawn on shaft 138b.

In this particular embodiment shown in FIG. 3, the first cylindrical shaft 138a rotates within a stationary insert 140a that extends partially around the first cylindrical shaft 138a between the interior surface of the bore 132a and the exterior of the first cylindrical shaft 138a. Similarly, the second cylindrical shaft 138b rotates within a stationary insert 140b that extends partially around the second cylindrical shaft 138b between the interior surface of the bore 132b and the exterior of the second cylindrical shaft 138b. The first bore 132a and second bore 132b are both shown as cylindrical, but need not be, particularly where stationary inserts 140a and 140b are employed. It should be appreciated, however, that body 130 could be shaped to intimately engage the first and second cylindrical shafts 138a, 138b such that stationary inserts 140a, 140b would not be necessary. However, the use of the stationary inserts 140a, 140b facilitate assembly. A single insert could be employed instead of multiple inserts. In sum, one or more stationary inserts are employed in an embodiment of this invention, while, in other embodiments, stationary inserts are not employed.

An ultrasonic horn 142 extends into the horn passage 136 and is aligned over both the first cylindrical shaft 138a and the second cylindrical shaft 134b. With reference to FIG. 3, it can be seen that a power supply 144 and converter 146 provide the vibrational energy in the ultrasonic frequency range so that the horn 142 delivers ultrasonic energy at the ultrasonic treatment zone. The ultrasonic horn 142 includes a distal end 148 that is spaced from both the first cylindrical shaft 134a and the second cylindrical shaft 134b and shaped complementary to both of them, as at arcuate portion 152a and arcuate portion 152b, so as to define a portion of a double-arcuate ultrasonic treatment flow path 150. It should be appreciated that, by "shaped complementary" it is meant that the curvature of the distal end 148 closely mimics the curvature of both the first shaft 134a and the second shaft 134b, though an identical curvature is not specifically required. Indeed, where the horn 142 aligns over the area where the first shaft 138a and the second shaft 138b touch, i.e., proximate point 139, the horn 142 has a planar joining portion 155. In some embodiments, the curvature at arcuate portion 152a of the distal end 148 will be identical to the curvature of the shaft 138a, and the curvature at arcuate portion 152b of the distal end 148 will be identical to the curvature of the shaft 138b, such that the distal end 148 of the horn 142 could be intimately fitted directly on top of the cylindrical shaft 38, providing no gap there between, but for at the planar joining portion 155. However, variations in curvature are permitted, as the intent is to provide a double-arcuate ultrasonic treatment flow path 150. In the particular embodiment shown, it will be appreciated that the double-arcuate ultrasonic treatment flow path 150 is defined between the first cylindrical shaft 138a, the second cylindrical shaft 138b, the first stationary insert 140a, the second stationary insert 140b, the distal end 148 of the ultrasonic horn 142, and the horn passage 136. Further, while the distal end 148 includes a first and second arcuate portion 152a, 152b, it may also include planar feet 153, 154 extending laterally from the arcuate portions 152a and 152b.

The horn 142 is movable closer to and farther away from the cylindrical shafts 138a, 138b, as represented by the double-headed arrow A2. The horn 142 moves past an appropriate seal 143, which serves to prohibit the flow of material between the horn 142 and the wall of the horn passage 136. In one embodiment, the seal 143 is a high temperature graphite-filled polyimide fitted within a recess in the horn passage 136. By moving the horn 142 away from the cylindrical shafts 138a, 138b, a gap g2 is defined between the apex of the arcuate portion 152a of the horn 142 and the apex of the first cylindrical shaft 138a, and a gap g3 is defined between the apex of the arcuate portion 152b of the horn 142 and the apex of the second cylindrical shaft 138b. In embodiments where the arcuate portion 152a is identical to the curvature of the cylindrical shaft 138a, the gap g2, will remain constant along the majority of the circumference of the shaft 138a, but it will be appreciated that, in embodiments where the arcuate portion 152a is not identical, the gap will vary slightly. This is also true for gap g3. In particular embodiments, the shafts 138a, 138b and the arcuate portions 152a, 152b are sized so that the gap g2 is the same as the gap g3. The gap at the feet 53, 54, when present, will be similar, but need not be identical to the gaps, g2 and g3. It will be appreciated that the gap under the joining portion 155 will be larger due to the space created as the two shafts 138a, 138b extend toward touching one another.

With respect to the twin screw extruder 110, it should be noted that the size of the gaps g2 and g3 may have the same ranges as those described above for the single screw extruder 10 of FIGS. 1 and 2. Similarly, the residence time under the horn 142, i.e., the residence time at the double-arcuate ultrasonic flow path 150 and the frequency and amplitude of the ultrasonic horn 142 may be the same as those described above. The horn 142 is also preferably water cooled, as noted with respect to FIG. 5.

It will be appreciated that, just as with horn 42, horn 142 is rectangular in cross section in some embodiments such that the volume of material advanced through the double-arcuate ultrasonic treatment flow path 150 experiences a more uniform ultrasonic treatment time distribution. It should further be noted that the arcuate portion 152 extends from one sidewall of the rectangular horn to the opposite sidewall. The structure of the present horn is more robust, particularly when including the feet 153, 154.

It should be noted that, while the present figures show one horn 142 at the ultrasonic treatment zone 124, multiple horns could be employed. For example, is some embodiments, the general structure shown for horn 142 entering a horn passage 136 extending downwardly through the body 130 could be repeated for a second horn entering a horn passage extending upwardly through the body, or even from the left or right, though those entering from the left or right would interact with only one shaft. Additionally, more than one ultrasonic treatment zone 124 may be placed along the length of the barrel 114.

From the ultrasonic treatment zone 124, the cylindrical shafts 138a, 138b, which include no threads, are secured or otherwise associated with a threaded shafts as at 160 (FIG. 3). The decrosslinked plastic or devulcanized rubber forced out of the ultrasonic treatment zone 124 is thereby advanced to the die 122, and, as already mentioned, the extruder 110 may include modular screw elements.

With the structure disclosed above, a process for decrosslinking crosslinked plastics or devulcanizing rubber includes feeding crosslinked plastic or vulcanized rubber to a screw extruder 110 having a twin screws in a barrel 114. For the remainder of the disclosure of this process, the crosslinked plastic and vulcanized rubber are simply referred to as "material". The material is advanced, by rotation of the twin screws, to the ultrasonic treatment zone 124 in the barrel 114. The ultrasonic treatment zone includes a body 130 having a twin bore 135 therethrough formed of joined first and second bores 132a, 132b. The body 130 also has a horn passage 136 communicating with the twin bore 135. A first cylindrical shaft 138a is associated with a first screw 116 of the twin screws to rotate therewith, and rotates in the bore 132a of the body 130, while a second cylindrical shaft 138b is associated with a second screw (not shown) of the twin screws to rotate therewith, and rotates in the bore 132b of the body 130. The shafts 138a, 138b provide no threads such that the material is not advanced by rotation of the shafts 138a, 138b, but rather is advanced by rotation of the twin screws forcing the material into the ultrasonic treatment zone 124. An ultrasonic horn 142 extends into the horn passage 136 and is aligned over the first and second cylindrical shafts 138a, 138b. The ultrasonic horn 142 has a distal end 148 that is spaced from the first and second cylindrical shafts 138a, 138b, the distal end 148 being shaped complementary to first and second cylindrical shafts 138a, 138b to define a portion of a double-arcuate ultrasonic treatment flow path 150.

The material is advanced through the double-arcuate ultrasonic treatment flow path 150 and is ultrasonically treated at the arcuate ultrasonic treatment flow path 150 by ultrasonic waves generated by the ultrasonic horn 142. The treatment follows the residence times, frequencies and amplitudes disclosed herein. The result is that the material, in the case of vulcanized rubber is devulcanized, and, in the case of crosslinked plastic, is decrosslinked.

EXAMPLES

Single Screw Extruder Decrosslinking of Crosslinked Plastic

Low density polyethylene (LDPE) film crosslinked by dicumyl peroxide was decrosslinked in a single screw extruder including an ultrasonic treatment zone as taught herein. A proprietary waste crosslinked LDPE film, obtained from a manufacturer was fed at a feed rate of 1 pounds/hour by an agitated twin screw feeder into the hopper of a single screw extruder of this invention, and was advanced to the ultrasonic treatment zone by rotating the screw at a speed of 100 rpm. In the arcuate ultrasonic treatment flow path, the gap between the apex of the curvature of the horn and the apex of the shaft associated with the screw was 2.5 mm. At this flow rate and flow path cross section, the residence time in the ultrasonic treatment zone was 7.0 seconds. The horn operated at a frequency of 20 kHz and an amplitude of 10 μm. The barrel temperature was set at 160° C. in the feeding section and 180° C. in all other zones. To avoid overheating the LDPE, the temperature of the horns was regulated by cooling water at 80° C. with a flow rate of 2500 cc/min. The LDPE was advanced through the arcuate ultrasonic treatment flow path, where it was subjected to ultrasonic treatment and shearing by the rotational action of the shaft. Ultrasonic power consumption, extrusion pressure and temperature before and after the ultrasonic treatment zone were recorded by a computer through a data acquisition system. Torque was read from the power consumption of the motor of the extruder.

After such treatment, the decrosslinked LDPE advanced through the plasticating section and was extruded through a die and pelletized for further characterization and shaping. Unexpectedly, the extrudate was in the form of a continuous rope, which is typically experienced in the case of virgin plastic. If need arises, shaping can be done immediately at the exit from the extruder by installing a proper shaping die. The pressure and residence time in the ultrasonic treatment zone can be varied by varying the flow rates, die dimensions and gap between in the arcuate ultrasonic treatment zone. These are important variables determining the action of ultrasound. Other processing parameters such as temperature and ultrasonic amplitude can also be varied.

Figure 7:
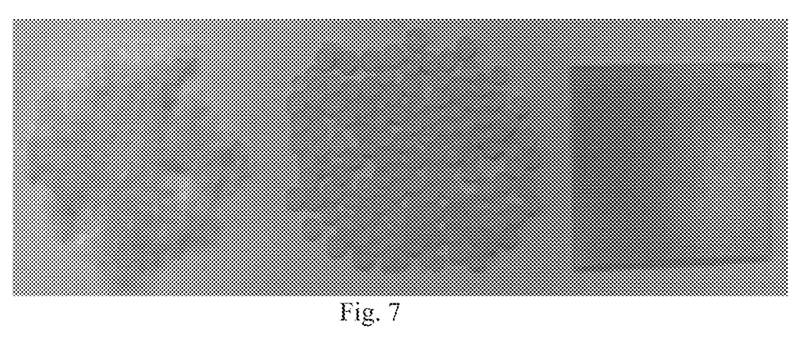
FIG. 7 provides photographs of (a) powdered LDPE film crosslinked by peroxide, (b) decrosslinked LDPE pellets obtained from a single screw extruder in accordance with this invention, and (c) molded decrosslinked LDPE slab made from the pellets of FIG. 7(b)

The results obtained on dicumyl peroxide crosslinked LDPE films are highly encouraging. In particular, the extrudate was in the form of a continuous rope, which is typically experienced in the case of virgin plastic. FIG. 7, at (a), shows photographs of the initial crosslinked LDPE film; at (b), shows pellets collected at the die exit; and, at (c), shows the decrosslinked LDPE compression molded to form a slab. Clearly, the ultrasonically decrosslinked LDPE showed a good flowability to be easily shaped into products for further testing. Remarkably, the molded decrosslinked LDPE slab has retained its flexibility indicating that the thermal degradation in the extruder of the current design (FIG. 1) was not significant.

Figure 6:
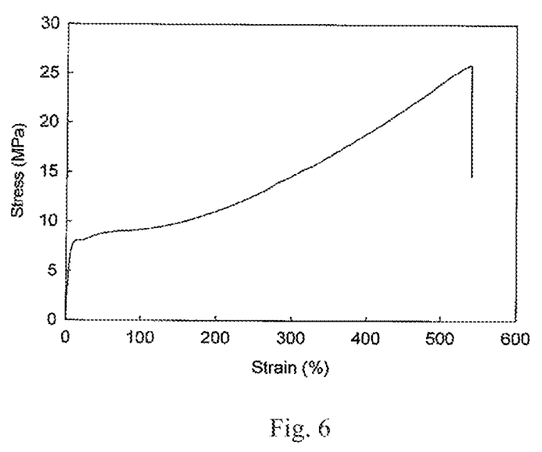
FIG. 6 is a graph of stress-strain behavior of a molding made from decrosslinked LDPE film, per an example herein.

FIG. 6 shows the stress-strain curve of the molded decrosslinked LDPE sample tested at an elongation rate of 20 mm/min. It is remarkable and unexpected that this data shows that the decrosslinked LDPE molding is very tough exhibiting the tensile strength and elongation at break of approximately 25 MPa and 550%, respectively. Mechanical properties of the original crosslinked LDPE film were not provided by the manufacturer. Also, we were unable to measure mechanical properties of the original film since the film was given to us in crushed form. Therefore, we compared the tensile properties of decrosslinked LDPE with those available from literature for original LDPE moldings crosslinked by 1.5 wt % peroxide. The tensile properties were specifically obtained from Khonakdar H. A., et al., Mechanical Properties of Uncrosslinked and Chemically Crosslinked Polyethylene/Ethylene Vinyl Acetate Copolymer Blends., J. Appl. Polym. Sci. 2007; 103: 3261-3270, wherein the crosslinked moldings are taught to have tensile strength and elongation at break of 9.9 MPa and 307%, respectively. Clearly, the molding prepared in the present example exhibits a significantly higher tensile strength and elongation at break. To obtain better mechanical properties, the ultrasonic extruder must control overheating of PE in the ultrasonic treatment zone. The present advanced design of the ultrasonic extruders provides well controlled cooling of ultrasonic horns through the cooling chamber disclosed herein.

Twin Screw Extruder Decrosslinking of Crosslinked Plastic

Figure 10:
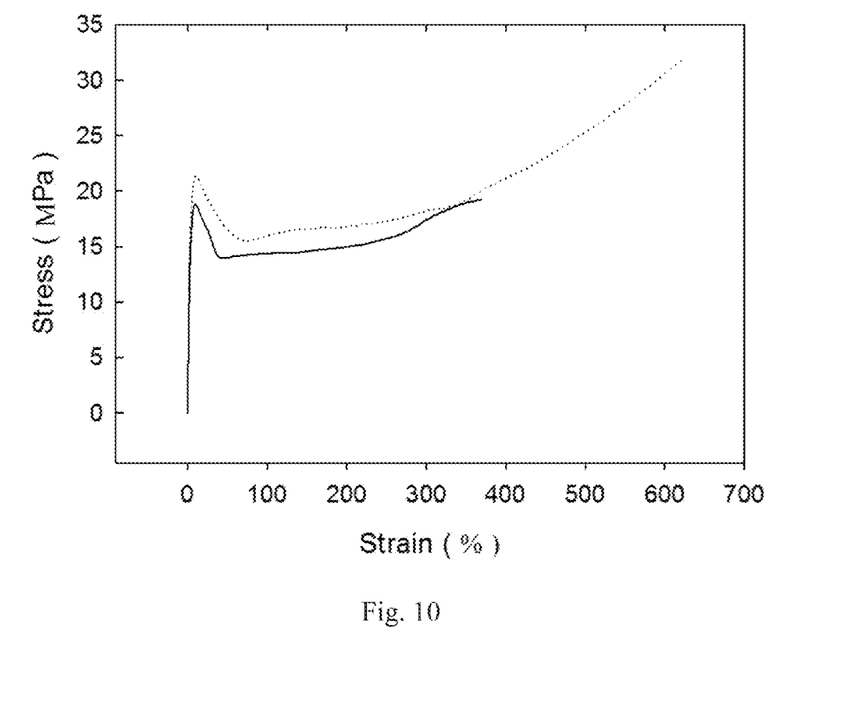
FIG. 10 is a graph of stress-strain behavior of a molding made from virgin, crosslinked HDPE (dotted line) and decrosslinked HDPE (solid line).

High density polyethylene (HDPE) crosslinked with 1% dicumyl peroxide was ground and fed to a twin screw extruder having an ultrasonic treatment zone in accordance with this invention. The ground HDPE was fed by a twin screw feeder at a feed rate of 1.1 lbs/hr into the hopper of an ultrasonic twin screw extruder. The twin screw extrusion devulcanization process is schematically depicted in FIGS. 3 and 4. The twin screw extruder used is a modular co-rotating twin screw extruder (Prism). It has diameters of 16 mm and L/D=25. The HDPE was fed by a feeder into the entrance section and was advanced by the screws co-rotating at a speed of 200 rpm. This extruder offers a precise control of the temperature and rotation speed with the horn temperature controlled by water delivered from a thermostat at temperature 45° C. After passing through the feeding section of the twin screw extruder, the HDPE was passed through the ultrasonic treatment zone where it was subjected to ultrasonic waves with a frequency of 40 kHz at and amplitude of 10 μm. In this section the HDPE was decrosslinked and then further plasticated and pushed through a die having a circular hole. The temperature setup in the barrel was 190° C. in the feed section and 200° C. in all other sections including the die region. The stress-strain results are shown in FIG. 10, comparing the treated plastic to virgin plastic.

Twin Screw Extruder Devulcanization of Rubber

Powdered whole tire vulcanized rubber was devulcanized in a twin screw extruder having an ultrasonic treatment zone in accordance with this invention. Powders of mesh sizes of 40 and 200 were used, the powders being obtained from a manufacturer (Lehigh Technologies, micronized rubber powder derived from end-of-life tires). The powder of 200 mesh was fed by a twin screw feeder at a feed rate of 1.5 lbs/hr into the hopper of an ultrasonic twin screw extruder.

The twin screw extrusion devulcanization process is schematically depicted in FIGS. 3 and 4. The twin screw extruder used is a modular co-rotating twin screw extruder (Prism). It has diameters of 16 mm and L/D=25. The whole tire rubber powder was fed by a feeder into the entrance section. Powder was advanced by the screws co-rotating at a speed of 200 rpm. This extruder offers a precise control of the temperature and rotation speed with the horn temperature controlled by water delivered from a thermostat at temperature 90° C. After passing through the feeding section of the twin screw extruder, the tire rubber powder was passed through the ultrasonic treatment zone where it was subjected to ultrasonic waves with a frequency of 40 kHz at various amplitudes of 3.5, 5, 7.5, 10, and 13 μm. In this section the rubber powder was devulcanized and then further plasticated and pushed through a die having a circular hole. The temperature setup in the barrel was 150 C in the feed section and 180 C in all other sections including the die region. Interestingly, without imposition of ultrasonic wave the rubber exiting the circular die was in powder form similar to the original rubber powder. Experiments conducted on tire rubber powder of 200 mesh at an ultrasonic amplitude of 3.5 μm indicated that the powder is converted into a flowable material with the extrudate exiting the die exhibiting a rough highly distorted surface. When the ultrasonic amplitude was increased to 5 μm, the surface irregularity was reduced and finally, at amplitudes of 7.5, 10 and 13 μm, the surface irregularity was unexpectedly diminished such that the devulcanized rubber exited the die as a continuous smooth extrudate typical of virgin unvulcanized rubber compound.

Figure 8:
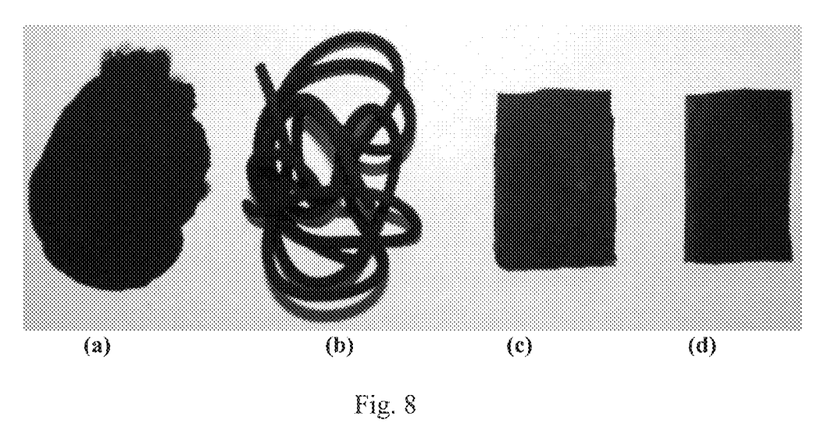
FIG. 8 provides photographs of 200 mesh ground whole tire rubber treated through a twin screw extruder in accordance with this invention, showing the initial vulcanized rubber in powdered form and the treated rubber, i.e., devulcanized rubber, extruded and reformed into a slab.

FIG. 8 shows photographs of the initial tire rubber powder (a), the extrudate of devulcanized rubber (b), the compression molded slab mixed with curative (c) and the revulcanized rubber slab (d) of 200 mesh ground rubber tire (GRT) treated at the following devulcanization conditions: feed rate of 0.19 grams/second, ultrasonic amplitude of 13 μm, frequency of 40 kHz, ultrasonic gap (g2/g3) of 2.5 millimeters, and temperature at various extruder zones from feeding section to die at 100/180/180/180/160/150° C.

Figure 9:
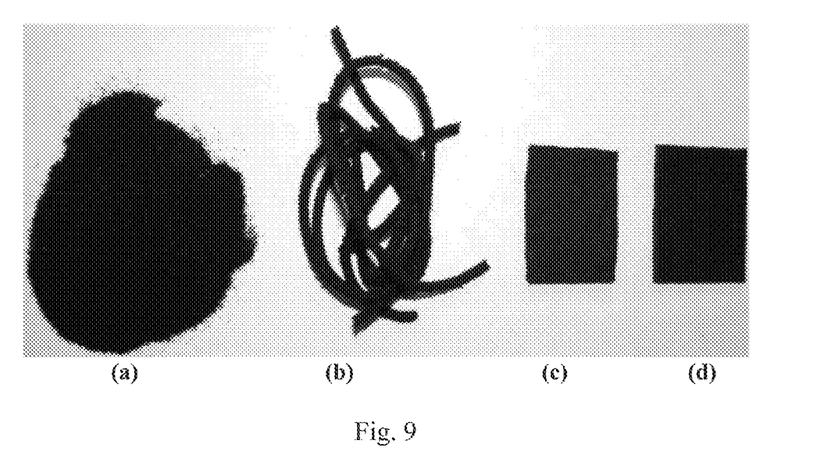
FIG. 9 provides photographs of 40 mesh ground whole tire rubber treated through a twin screw extruder in accordance with this invention, showing the initial vulcanized rubber in powdered form and the treated rubber, i.e., devulcanized rubber, extruded and reformed into a slab.

In addition, devulcanization experiments were conducted on tire rubber powder of 40 mesh at a flow rate of 1.5 lbs/hr using the same temperature setup as in case of 200 mesh rubber. Ultrasonic frequency was 40 kHz at various amplitudes of 3.5, 5, 7.5, 10 and 13 μm. In this case rubber exiting the die was in powder form but exhibited some softness and cohesiveness. However, it was easily broken loose extrudate until the amplitude of 10 μm. Only at the amplitude of 13 μm was a continuous smooth extrudate obtained. FIG. 9 shows photographs of the initial tire rubber powder (a), the extrudate of devulcanized rubber (b), the compression molded slab mixed with curative (c) and the revulcanized rubber slab (d) of 40 mesh ground rubber tire (GRT) treated at the following devulcanization conditions: feed rate of 0.19 grams/second, ultrasonic amplitude of 13 μm, frequency of 40 kHz, ultrasonic gap (g2/g3) of 2.5 millimeters, and temperature at various extruder zones from feeding section to die at 100/180/180/180/160/150° C.

What is claimed is:

1. A process for decrosslinking crosslinked plastic or devulcanizing vulcanized rubber comprising the steps of:
   feeding crosslinked plastic or vulcanized rubber to a twin screw extruder having a first screw and second screw in a barrel, the first screw having a first axis and the second screw having a second axis;
   advancing the crosslinked plastic or vulcanized rubber, by rotation of the first screw and the second screw, to an ultrasonic treatment zone in the barrel, the ultrasonic treatment zone including:
      a body including:
         a first bore through the body, the first bore having a bore axis that is coaxial with the axis of the first screw,
         a second bore through the body, the second bore having a bore axis that is coaxial with the axis of the second screw, the first bore and second bore overlapping to create a twin bore, and
         a horn passage communicating with both the first bore and the second bore of the twin bore,
      a first cylindrical shaft associated with the first screw to rotate therewith, the first cylindrical shaft rotating in the first bore of the body and providing no threads such that the crosslinked plastic or vulcanized rubber is not advanced by rotation of the first cylindrical shaft, but rather is advanced by rotation of the first screw and second screw forcing the crosslinked plastic or vulcanized rubber into the ultrasonic treatment zone,
      a second cylindrical shaft associated with the second screw to rotate therewith, the second cylindrical shaft rotating in the second bore of the body and providing no threads such that the crosslinked plastic or vulcanized rubber is not advanced by rotation of the second cylindrical shaft, but rather is advanced by rotation of the first screw and second screw forcing the crosslinked plastic or vulcanized rubber into the ultrasonic treatment zone, the first cylindrical shaft and second cylindrical shaft contacting one another,
      an ultrasonic horn extending into said horn passage, the ultrasonic horn being aligned over both the first shaft and second shaft and having a distal end spaced from the first shaft and the second shaft, the distal end being shaped complementary to the first shaft and the second cylindrical shaft to define a portion of a double-arcuate ultrasonic treatment flow path;
   advancing the crosslinked plastic or vulcanized rubber through the double-arcuate ultrasonic treatment flow path; and
   ultrasonically treating the crosslinked plastic or vulcanized rubber at the double-arcuate ultrasonic treatment flow path by ultrasonic waves generated by the ultrasonic horn.

2. The process of claim 1, wherein the first bore and the second bore in the body are devoid of channels.

3. The process of claim 1, wherein the distal end of the ultrasonic horn is rectangular in cross section such that the volume of crosslinked plastic or vulcanized rubber advanced through the double-arcuate ultrasonic treatment flow path in said step of advancing the crosslinked plastic or vulcanized rubber through the double-arcuate ultrasonic treatment flow path experiences a more uniform ultrasonic treatment time distribution.

4. The process of claim 1, wherein the ultrasonic treatment zone further comprises one or more stationary inserts extending partially around the first shaft within the first bore and the second shaft within the second bore of the body, the double-arcuate ultrasonic treatment flow path being defined between the first shaft, the second shaft, at least one of the one or more stationary inserts, the distal end of the ultrasonic horn and the horn passage.

5. The process of claim 1, wherein the frequency of the ultrasonic waves is from 15 kHz to 1000 kHz.

6. The process of claim 5, wherein the amplitude of the ultrasonic waves is from 2 microns to 100 microns.

7. The process of claim 6, wherein the residence time of the crosslinked plastic or vulcanized rubber in the arcuate ultrasonic treatment flow path is less than 5 seconds.

8. A twin screw extruder having a first screw and second screw in a barrel, the first screw having a first axis and the second screw having a second axis, the twin screw extruder characterized in that it includes an ultrasonic treatment zone in the barrel, the ultrasonic treatment zone comprising:

a body including a first bore through the body, the first bore having a bore axis that is coaxial with the axis of the first screw, a second bore through the body, the second bore having a bore axis that is coaxial with the axis of the second screw, the first bore and second bore overlapping to create a twin bore, and a horn passage communicating with both the first bore and the second bore of the twin bore;

a first cylindrical shaft associated with the first screw to rotate therewith, the first cylindrical shaft rotating in the first bore of the body and providing no threads;

a second cylindrical shaft associated with the second screw to rotate therewith, the second cylindrical shaft rotating in the second bore of the body and providing no threads, the first cylindrical shaft and second cylindrical shaft contacting one another; and an ultrasonic horn extending into said horn passage, the ultrasonic horn being aligned over both the first shaft and second shaft and having a distal end spaced from the first shaft and the second shaft, the distal end being shaped complementary to the first cylindrical shaft and the second cylindrical shaft to define a portion of a double-arcuate ultrasonic treatment flow path.

* * * * *